US009235489B2

(12) United States Patent
Xiong et al.

(10) Patent No.: US 9,235,489 B2
(45) Date of Patent: Jan. 12, 2016

(54) TESTING SCHEDULING SYSTEM AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Kai Xiong, Shenzhen (CN); Xin Lu, Shenzhen (CN); Yu-Yong Zhang, Shenzhen (CN); Huan-Huan Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 99 days.

(21) Appl. No.: 14/291,005

(22) Filed: May 30, 2014

(65) Prior Publication Data

US 2014/0359368 A1    Dec. 4, 2014

(30) Foreign Application Priority Data

Jun. 3, 2013    (CN) .......................... 2013 1 0216042

(51) Int. Cl.
    *G06F 11/26*    (2006.01)
(52) U.S. Cl.
    CPC ..................................... *G06F 11/26* (2013.01)

(58) Field of Classification Search
    CPC ...... H04L 45/00; H04L 45/12; H04L 12/2697; H04L 12/4641
    See application file for complete search history.

(56) References Cited

U.S. PATENT DOCUMENTS 8,589,214 B1 * 11/2013 Scott ...................... G05B 17/02
                                                    705/7.28
9,160,447 B1 * 10/2015 Pillai ...................... H04B 10/07

* cited by examiner

*Primary Examiner* — Jigar Patel
(74) *Attorney, Agent, or Firm* — Novak Druce Connolly Bove + Quigg LLP

(57) ABSTRACT

A testing scheduling system for optimizing and scheduling a testing path among a plurality of available work station calculates a distance between work stations according to the coordinates of the of the available work stations, assigns a value to a quantity, and applies this to the failure rate of each work station, the backlog quantities of each work station, the test-awaited quantities, and the distances between each available work station to acquire a failure rate value, a backlog quantities value, a test-awaited quantities value, and a distances value. The testing scheduling system further calculates a first weighted value of each available work station by summing the failure rate value, the backlog quantities value, the test-awaited quantities value, and the distances value of each available work station, and analyzes the first weighted values to determine a preferred work station.

8 Claims, 3 Drawing Sheets

TESTING SCHEDULING SYSTEM AND METHOD

FIELD

The present disclosure relates to a testing scheduling system and a method for scheduling a number of work stations.

BACKGROUND

An operator usually selects a work station arbitrarily from a number of similar work stations to test a worked state of products by experience, without considering other factors such as a failure rate of each work station or a pass-after-initial-failure rate of each work station.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the present disclosure will be described with reference to the accompanying drawings.

Figure 1:
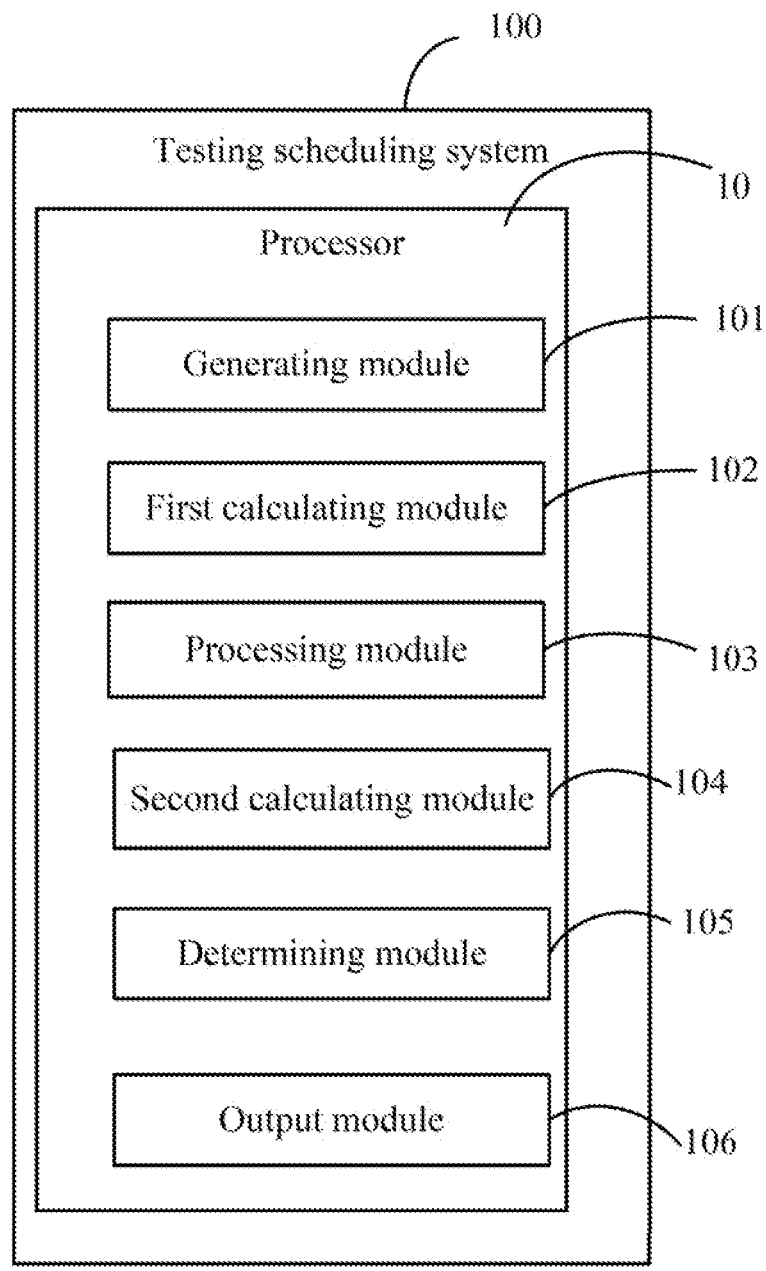
FIG. 1 is a block diagram of a testing scheduling system in accordance with an exemplary embodiment.

FIG. 1 illustrates a testing scheduling system (hereinafter "system") 100 for optimizing and scheduling a testing path among a number of available work stations. Each available work station is used to test a worked state of a product, and is assigned a name, a coordinate, a failure rate, a backlog status (hereinafter, "the backlog quantity"), a quantity of products awaiting testing (hereinafter, "the test-awaited quantity"), a pass-after-initial-failure rate, and a standard period of time for testing a qualified product.

The system 100 includes a first calculating module 102, a processing module 103, a second calculating module 104, a determining module 105, and an output module 106, being a collection of software instructions executed by one or more processor 10.

The first calculating module 102 calculates distances (hereinafter, "the distances between work stations") between every available work station according to the coordinates of the locations of the available work stations. The processing module 103 assigns a value to a quantity, or assigns a point on a scale to a quantity, and applies this to the failure rate of each work station, the backlog quantities of each work station, the test-awaited quantities, and the distances between each available work station to acquire a failure rate value, a backlog quantities value, a test-awaited quantities value, and a distances value enabling a global calculation to be carried out for every available work station in relation to all other work stations.

The second calculating module 104 calculates a first weighted value of each available work station by summing the failure rate value, the backlog quantities value, the test-awaited quantities value, and the distances value of each available work station. The determining module 105 analyzes the first weighted values of all available work stations, and determines a work station which has the smallest first weighted value, as a preferred work station, from all available work stations. The output module 106 outputs the name of work station so determined.

In a second embodiment, the system 100 further includes a generating module 101. The generating module 101 randomly generates a period of time for the testing of an unqualified product. Herein, the time generated falls into a range from zero to the standard period of time. The first calculating module 102 calculates a scalar product (hereinafter, "the scalar product") of the time and the failure rate of each available work station. The processing module 103 assigns a value to a quantity, or assigns a point on a scale to a quantity, and applies this to the pass-after-initial-failure rate of each work station, and the scalar product of each work station to acquire a pass-after-initial-failure rate value, and a scalar product value enabling a global calculation to be carried out for every available work station in relation to all other work stations. The second calculating module 104 calculates a second weighted value of each available work station by summing the pass-after-initial-failure rate value, the scalar product value, the backlog quantities value, the test-awaited quantities value, and the distances value of each available work station. The determining module 105 analyzes the second weighted value of each work station, and determines mathematically a shortest path between a starting work station and an ending work station based on an analysis result of the second weighted value of each work station. The output module 106 outputs a sequence of the names of the work stations in the shortest path as determined. In one embodiment, the mathematics includes Dijkstra arithmetic. In detail, the determining module 105 analyzes all paths from the starting work station to the ending work station, determines the identities of the work stations in each path, calculates a sum of the second weighted values of the work stations in each path, and determines that the path with the smallest applicable sum is the shortest path. In another embodiment, Floyd arithmetic can be included in the mathematics.

Figure 2:
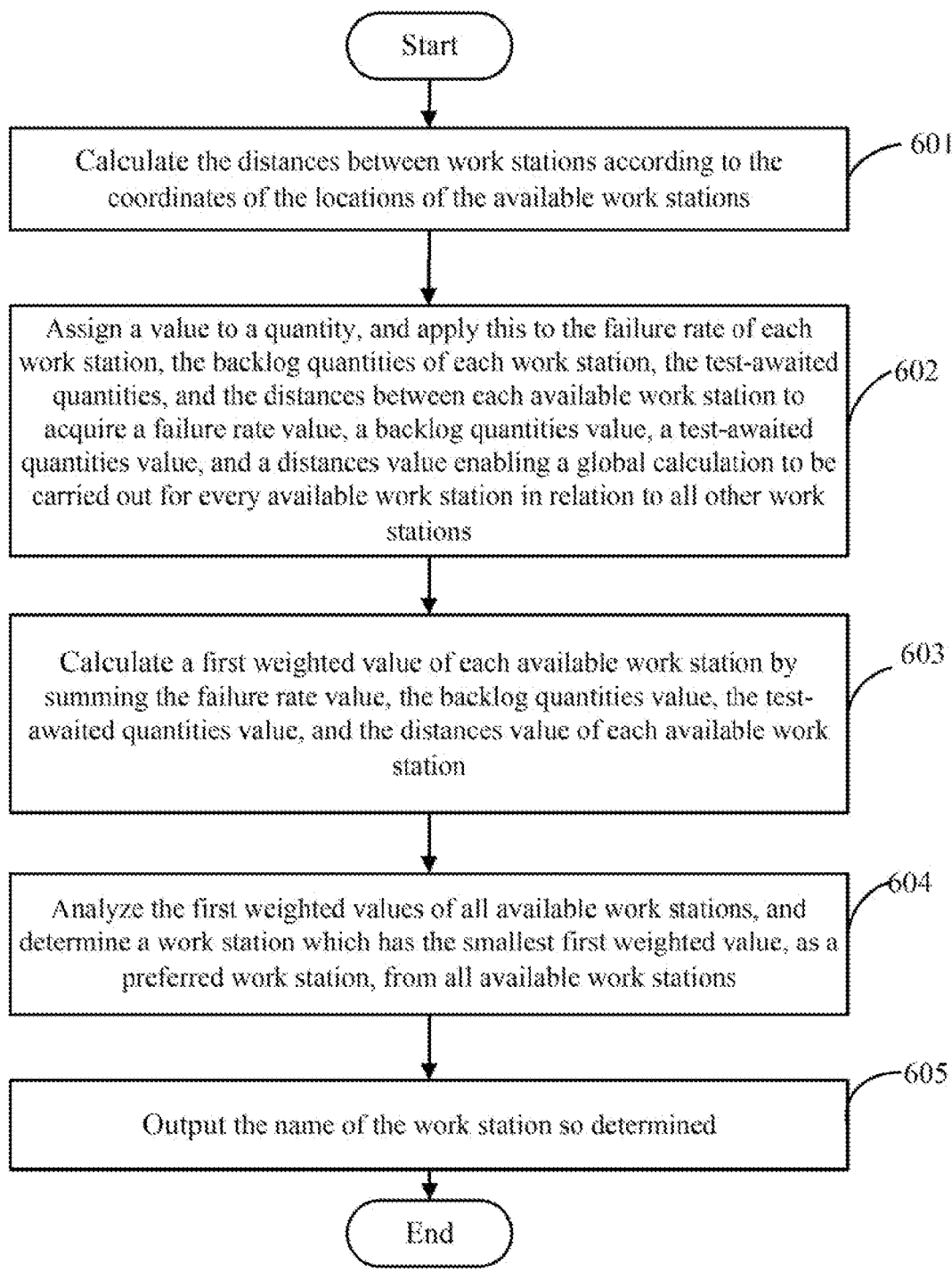
FIG. 2 is a flowchart of a method for one part of scheduling work stations which is implemented by the testing scheduling system of FIG. 1.

FIG. 2 is a flowchart of a method of determining one part of work stations implemented by the testing scheduling system of FIG. 1.

In 601, a first calculating module calculates the distances between work stations according to the coordinates of the locations of the available work stations.

In 602, a processing module assigns a value to a quantity, or assigns a point on a scale to a quantity, and applies this to the failure rate of each work station, the backlog quantities of each work station, the test-awaited quantities, and the distances between each available work station to acquire a failure rate value, a backlog quantities value, a test-awaited quantities value, and a distances value enabling a global calculation to be carried out for every available work station in relation to all other work stations.

In 603, a second calculating module calculates a first weighted value of each available work station by summing In 604, a determining module analyzes the first weighted values of all available work stations, and determines a work station which has the smallest first weighted value, as a preferred work station, from all available work stations.

In 605, an output module outputs the name of the work station so determined.

Figure 3:
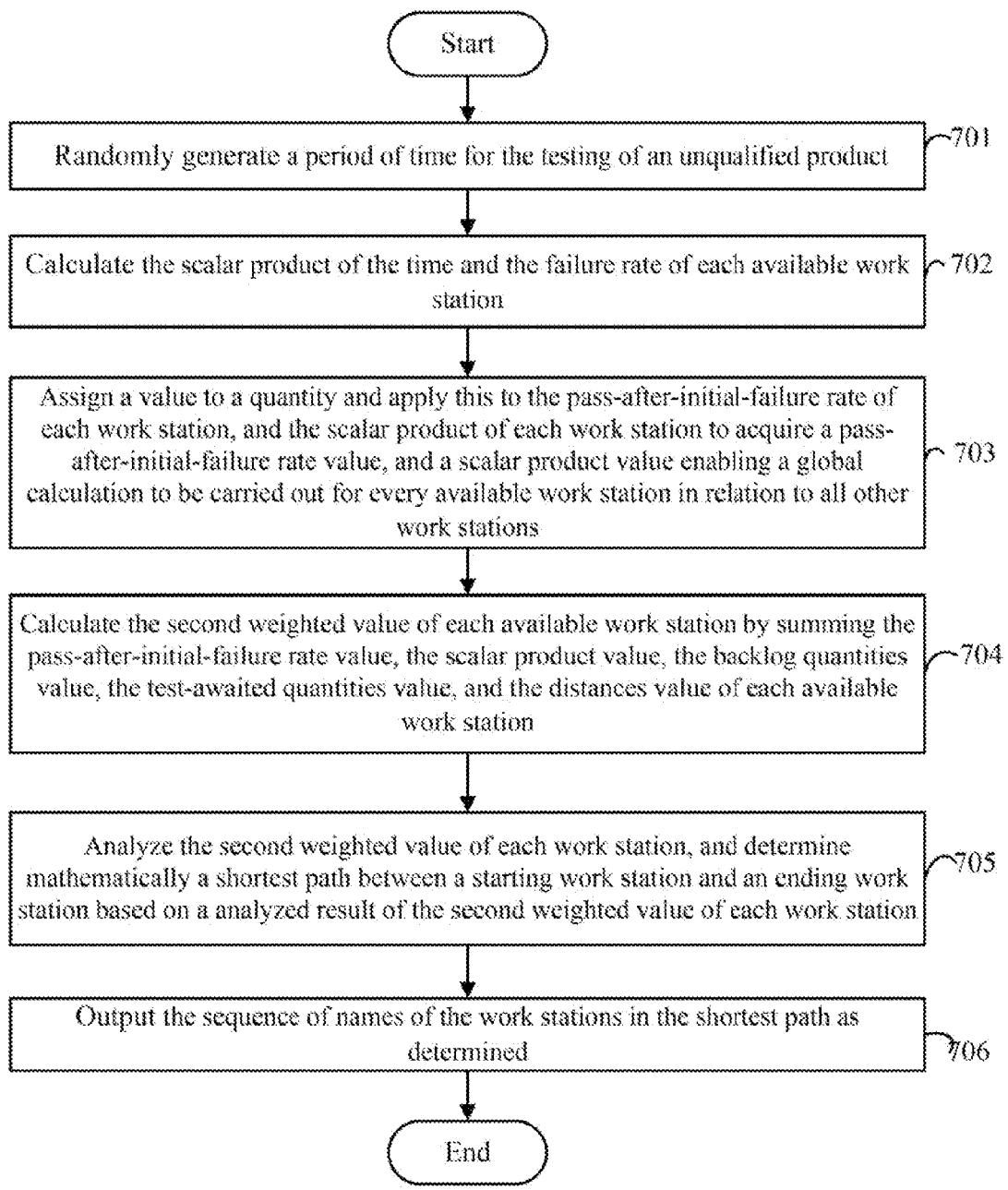
FIG. 3 is a flowchart of a method for overall scheduling work stations implemented by the testing scheduling system of FIG. 1.

FIG. 3 is a flowchart of a method of determining the overall scheduling of testing implemented by the testing scheduling system of FIG. 1.

In 701, a generating module randomly generates a period of time for the testing of an unqualified product.

In 702, the first calculating module calculates the scalar product of the time and the failure rate of each available work station.

In 703, the processing module assigns a value to a quantity, or assigns a point on a scale to a quantity, and applies this to the pass-after-initial-failure rate of each work station, and the scalar product of each work station to acquire a pass-after-initial-failure rate value, and a scalar product value enabling a global calculation to be carried out for every available work station in relation to all other work stations.

In 704, the second calculating module calculates the second weighted value of each available work station by summing the pass-after-initial-failure rate value, the scalar product value, the backlog quantities value, the test-awaited quantities value, and the distances value of each available work station.

In 705, the determining module analyzes the second weighted value of each work station, and determines mathematically a shortest path between a starting work station and an ending work station based on an analysis result of the second weighted value of each work station.

In 706, the output module outputs the sequence of names of the work stations in the shortest path as determined.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A testing scheduling system for optimizing and scheduling a testing path among a plurality of available work stations, each available work station being assigned a name, a coordinate, a failure rate, a backlog quantity, a test-awaited quantity, a pass-after-initial-failure rate, and standard period of time for testing a qualified product, the testing scheduling system comprising:
   one or more processors; and
   a plurality of modules to be executed by the one or more processors, wherein the plurality of modules comprises:
     a first calculating module configured to calculate a distance between each two work stations according to the coordinates of the locations of the available work stations;
     a processing module configured to assign a value to a quantity, and apply this to the failure rate of each work station, the backlog quantities of each work station, the test-awaited quantities, and the distances between each available work station to acquire a failure rate value, a backlog quantities value, a test-awaited quantities value, and a distances value;
     a second calculating module configured to calculate a first weighted value of each available work station by summing the failure rate value, the backlog quantities value, the test-awaited quantities value, and the distances value of each available work station;
     a determining module configured to analyze the first weighted values of all available work stations, and determine a work station which has the smallest first weighted value, as a preferred work station, from all available work stations; and
     an output module configured to output the name of the work station as determined.

2. The testing scheduling system as described in claim 1, wherein the plurality of modules further comprises:
   a generating module configured to randomly generate a period of time for the testing of an unqualified product, wherein the time falls into a range from zero to the standard period of time;
   the first calculating module further configured to calculate a scalar product of the time and the failure rate of each available work station;
   the processing module further configured to assign a value to a quantity, and apply this to the pass-after-initial-failure rate of each work station, and the scalar product of each work station to acquire a pass-after-initial-failure rate value, and a scalar product value;
   the second calculating module further configured to calculate a second weighted value of each available work station by summing the pass-after-initial-failure rate value, the scalar product value, the backlog quantities value, the test-awaited quantities value, and the distances value of each available work station;
   the determining module further configured to analyze the second weighted value of each work station, and determine mathematically a shortest path between a starting work station and an ending work station based on an analysis result of the second weighted value of each work station; and
   the output module further configured to output a sequence of names of the work stations in the shortest path as determined.

3. The testing scheduling system as described in claim 2, wherein the mathematics comprises Dijkstra arithmetic, the determining module is configured to analyze all paths from the starting work station to the ending work station, determine the identities of the work stations in each path, calculate a sum of the second weighted values of the work stations in each path, and determine that the path with the smallest applicable sum is the shortest path.

4. The testing scheduling system as described in claim 2, wherein the mathematics comprises Floyd arithmetic.

5. A testing scheduling method for optimizing and scheduling a testing path among a plurality of available work stations, each available work station being assigned a name, a coordinate, a failure rate, a backlog quantity, test-awaited quantity, a pass-after-initial-failure rate, and standard period of time for testing a qualified product, the testing scheduling method comprising:
   calculating a distance between each two work stations according to the coordinates of the locations of the available work stations;
   assigning a value to a quantity, and applying this to the failure rate of each work station, the backlog quantities of each work station, the test-awaited quantities, and the distances between each available work station to acquire a failure rate value, a backlog quantities value, a test-awaited quantities value, and a distances value;

calculating a first weighted value of each available work station by summing the failure rate value, the backlog quantities value, the test-awaited quantities value, and the distances value of each available work station;

analyzing the first weighted values of all available work stations, and determining a work station which has the smallest first weighted value, as a preferred work station, from all available work stations; and outputting the name of work station as determined.

6. The testing scheduling method as described in claim 5, further comprising:

randomly generating a period of time for the testing of an unqualified product, wherein the time falls into a range from zero to the standard period of time;

calculating a scalar product of the time and the failure rate of each available work station;

assigning a value to a quantity, and applying this to the pass-after-initial-failure rate of each work station, and the scalar product of each work station to acquire a pass-after-initial-failure rate value, and a scalar product value;

calculating a second weighted value of each available work station by summing the pass-after-initial-failure rate value, the scalar product value, the backlog quantities value, the test-awaited quantities value, and the distances value of each available work station;

analyzing the second weighted value of each work station, and determining mathematically a shortest path between a starting work station and an ending work station based on an analysis result of the second weighted value of each work station; and outputting a sequence of names of the work stations in the shortest path as determined.

7. The testing scheduling method as described in claim 6, wherein the mathematics comprises Dijkstra arithmetic, the method further comprises:

analyzing all paths from the starting work station to the ending work station;

determining the identities of the work stations in each path; and calculating a sum of the second weighted values of the work stations in each path, and determining that the path with the smallest applicable sum is the shortest path.

8. The testing scheduling method as described in claim 6, wherein the mathematics comprises Floyd arithmetic.

* * * * *